United States Patent [19]

Monro

[11] 4,444,128

[45] Apr. 24, 1984

[54] HEAT GENERATOR

[76] Inventor: Richard J. Monro, 41 Sunset La., Ridgefield, Conn. 06877

[21] Appl. No.: 385,051

[22] Filed: Jun. 4, 1982

Related U.S. Application Data

[63] Continuation of Ser. No. 218,355, Dec. 19, 1980, abandoned, which is a continuation of Ser. No. 26,028, Apr. 2, 1979, abandoned.

[51] Int. Cl.³ .............................................. F23J 11/00
[52] U.S. Cl. ...................................... 110/345; 55/73; 110/215; 110/216; 110/302; 165/5
[58] Field of Search ............... 110/215, 216, 210, 302, 110/345, 344; 55/73, 83; 431/215; 261/153; 165/5

[56] References Cited

U.S. PATENT DOCUMENTS

| | | | |
|---|---|---|---|
| 2,812,923 | 12/1957 | Schoenherr et al. | 165/5 |
| 3,733,777 | 5/1973 | Huntington | 55/48 |
| 3,839,849 | 10/1974 | Maniya | 55/222 |
| 4,089,088 | 5/1978 | Konczalski | 110/210 X |
| 4,284,609 | 8/1981 | de Vries | 423/242 |

FOREIGN PATENT DOCUMENTS

2724030 12/1978 Fed. Rep. of Germany .

987654 3/1965 United Kingdom .

*Primary Examiner*—Edward G. Favors
*Attorney, Agent, or Firm*—Louis H. Reens

[57] ABSTRACT

A method and apparatus for improving the efficiency of a heat generator in which combustible fuels such as fossil fuels, refuse, or other materials are burned is described. Flue gas generated in the heat generator and combustion air are passed in heat exchange relationship in a heat exchanger. The heat exchanger is selected so that it removes a substantial amount of heat from the flue gas, whose temperature is consequently lowered to a level where a corrosive pollutant such as $SO_3$ in the form of $H_2SO_4$ is likely to condense out. A pollutant removing liquid is applied onto the portion of the heat exchanger where the flue gas passes through both to scrub the flue gas and protect that portion of the heat exchanger from corrosive effects from condensed pollutants. Particulates and gaseous pollutants are removed from the flue gas and the heat exchanger by the liquid, which may be a neutralizing liquid such as an alkaline solution to provide a protective sheath for the heat exchanger against the effects of corrosive pollutants. In the described illustrative embodiment, the invention is shown in use with a thermal section for a large scale power plant.

27 Claims, 2 Drawing Figures

HEAT GENERATOR

PRIOR APPLICATIONS

This application is a continuation in part of Ser. No. 218,355 filed Dec. 19, 1980, abandoned, which is a continuation of Ser. No. 26,028 filed Apr. 2, 1979, and which latter application is now abandoned.

FIELD OF THE INVENTION

This invention relates to heat generators in which combustible fuels such as fossil fuels, refuse or other materials are burned. More specifically, this invention relates to a method and system for improving the efficiency of such heat generators and particularly for better utilization of heat produced in the thermal section for a large electric power plant using a combustible fuel.

BACKGROUND OF THE INVENTION

Heat generators using combustible fuels such as oil, coal, gas or refuse materials and the like, generate a substantial quantity of waste materials in the form of pollutant gases and particulates. Federal and state environmental requirements have imposed maximum emission standards for these waste materials. Compliance with these emission standards involves substantial investments for appropriate pollution control equipment, the costs for which can be prohibitively high.

For example, large systems are available to remove particulates using a dry flue gas treatment. Typical devices used for this purpose may involve electrostatic precipitators, bag houses and the like. These devices are suitable for the removal of the particulates, but gaseous pollutants are not removed and as can be appreciated, the addition of these devices increases cost and reduces the efficiency of the heat generator.

The magnitude of gaseous pollutants generated from the combustion of fuel throughout the world is enormous. As a result, many techniques have been described for the removal of these pollutants from flue gases exhausted from heat generators. A general statement of various wet scrubbing processes for pollutant removal from flue gases exhausted from large scale electric power plants can be found in a chapter entitled "Wet Scrubbing Process—$SO_x$ and $NO_x$ Removal Chemistry" by R. G. Nevill, at page 9-312 of "Energy Technology Handbook" edited by D. M. Considine and published by McGraw-Hill Book Company.

Flue gas wet scrubbing techniques also involve substantial investments with complex systems. For example, in the U.S. Pat. Nos. 3,320,906 to Domahidy and 3,733,777 to Huntington, wet scrubbers are described in which flue gases are passed through a filter bed for intimate contact with a wash liquid. The wash liquid may be an aqueous bisulfite salt solution such as described in the Huntington patent or such alkaline scrubbing liquors indicated as useful with the wet scrubber described in U.S. Pat. No. 4,049,399 to Teller.

Since corrosive liquid droplets are likely to be entrained by the scrubbed flue gas, special techniques such as described by Teller or in the U.S. Pat. No. to Brandt 3,844,740 may be used to avoid corrosion on subsequent equipment such as an induced draft fan located at the stack where the flue gas is exhausted to atmosphere.

Another technique for the removal of pollutants may involve cooling of the flue gas to such low temperatures that gaseous pollutants such as $SO_2$ and $SO_3$ condense out. One such system is described in the U.S. Pat. No. to Maniya 3,839,948, in which the flue gas is cooled to about 10° C. to condense that the sulfurous pollutants after which the flue gas is reheated before discharge to atmosphere.

These and other techniques for the removal of waste materials from flue gas involve a substantial amount of energy, much of which is irretrievably lost. As a result, the overall efficiency, i.e. the energy available for sale from a power plant is significantly reduced.

Techniques for preheating of air have been known and used for many years in connection with boilers to improve combustion. One such preheating technique employs a Ljungstrom air preheater. This uses a rotor through which on one side flue gas is passed while an inflow of combustion air is passed through the other side, with the two gas flows being in opposite direction. Air preheaters, however, are operated at sufficiently high temperatures to avoid condensation inside the heat exchanger of pollutants such as $SO_3$ present in the flue gas.

SUMMARY OF THE INVENTION

In a technique in accordance with the invention for the operation of a heat generator in which combustible fuels are burned, the thermal efficiency is improved by combining the preheating of the air for the heat generator with the removal of pollutants.

For example, as described herein with respect to one embodiment in accordance with the invention for the operation of a heat generator using combustible fuels, both an inflow of air and the flue gas from the combustion are passed through a heat exchanger, which is simultaneously flooded with a scrubbing liquid for removal of particulates and gaseous pollutants in the flue gas. Heat from the flue gas is transferred through the heat exchanger to the inflow of air for its preheating while the flue gas pollutants are removed by collecting the liquid after its passage through the heat exchanger.

It is well known that below about 700° F. $SO_3$ will combine with water vapor molecules to form $H_2SO_4$. At temperatures above approximately 300° F. in the flue gas the $H_2SO_4$ is a gas. The cooling of the flue gas can be carried out to a temperature at which a pollutant may condense out. For example, the flue gas may be cooled in the heat exchanger to a temperature at which $SO_3$ in the form of $H_2SO_4$ condenses out. By employing a suitable neutralizing scrubbing liquid, the corrosive effective of the condensed $SO_3$ is avoided, yet a substantial part and even virtually all of the $SO_3$ in its $H_2SO_4$ form in the flue gas is removed.

With a technique in accordance with the invention for operating a heat generator, its net thermal efficiency can be significantly increased. The technique can be applied to improve operating efficiencies of existing heat generators such as may be used in electric power plants, steel manufacturing furnaces, sulfur producing plants and the like.

It is, therefore, an object of the invention to improve the thermal efficiency of a heat generator using combustible fuels while removing pollutants from flue gas generated from the generator.

These and other advantages and objects of the invention can be understood from the following description of one illustrative embodiment in accordance with the invention and described in conjunction with the drawings.

DETAILED DESCRIPTION OF EMBODIMENT

Figure 1:
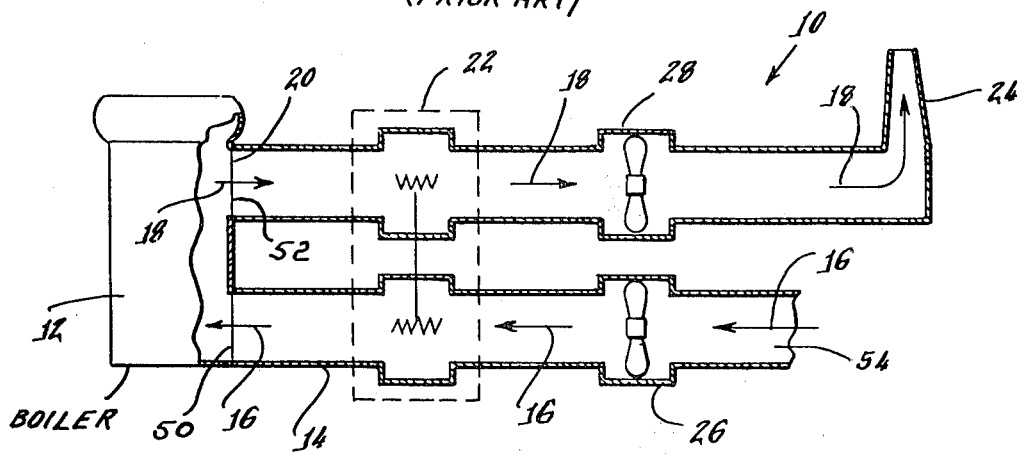
FIG. 1 is a schematic representation of a conventional thermal section for a power plant.

With reference to FIG. 1, the thermal section 10 of a conventional power plant is shown with a boiler 12 in which a suitable fuel such as fossil fuel in the form of coal, oil, or gas or other fuel such as a waste material is burned. An inflow of combustion air is provided, as suggested by arrows 16, through suitable ducts 14 into the boiler 12.

The boiler 12 includes suitable heat exchange elements (not shown) in which a working fluid (water or steam) is circulated for heating by the combustion gases generated in the boiler 12. Flue gas, as suggested by arrows 18, emerges at discharge 20 from the boiler 12 at a high temperature, typically in the range of about 650° F., and is passed through a heat exchanger 22 to preheat the inflow of air 14. After passage through heat exchanger 22, the flue gas 18 is discharged to atmosphere at a stack 24. Air flow through the thermal section 10 is obtained with a forced draft fan 26 and an induced draft fan 28.

The flue gas 18 may include pollutant materials in the form of particulates such as fly ash and gases such as $SO_2$, $SO_3$ and others. Techniques for removal of the pollutants are usually a part of the thermal section 10, though for purposes of simplicity of FIG. 1, these pollution controls have been left out of the schematic representation. Suffice it to say that techniques and devices for collecting particulates and pollutant gases from flue gases have been extensively described in the art.

It is generally recognized that, particularly in large electric power plants, the exhaust temperature of the flue gas should preferably be kept above the dew point of the acid $H_2SO_4$ to avoid corrosive effects from contact by precipitated $SO_3$ with equipment such as the induced draft fan 28. Hence, the amount of heat recaptured from the flue gas is usually limited to maintain the flue gas temperatures above the acid ($H_2SO_4$) dew point, i.e at about 300° F. As a result, the temperature of the inflow of air 16 at the boiler 12 is usually above 450° F. and the thermal efficiency of thermal section 10 is not as high as it could theoretically be made.

With a technique for operating a heat generator in accordance with the invention, a substantially greater amount of heat from flue gas is recaptured to achieve a high thermal efficiency while simultaneously extracting pollutants. This can be achieved with a thermal section 30 as described for a power plant as illustrated in FIG. 2.

Figure 2:
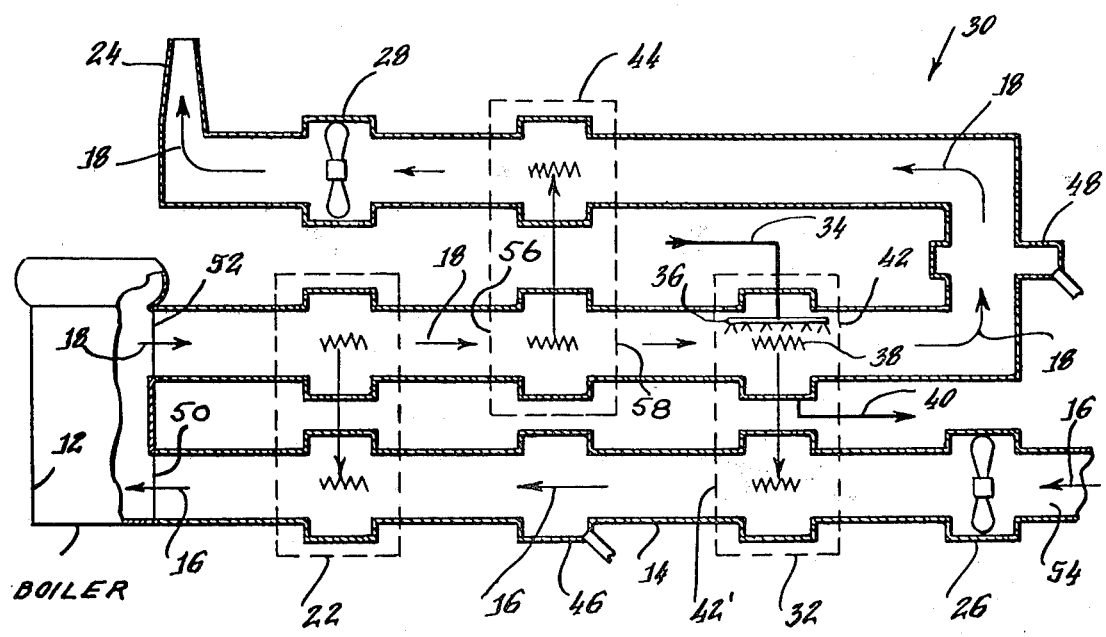
FIG. 2 is a schematic representation of a thermal section improved in accordance with the invention.

In FIG. 2, the flue gas 18, after passage through preheater 22, is passed through a heat exchanger 32 where a substantial portion of the heat in the flue gas 18 is extracted for transfer to the inflow of air 16.

The heat exchanger 32 operates with a working liquid which is applied through an inlet 34 from a supply (not shown) to sprayers 36 into the heat exchanger portion 38 through which the flue gas 18 is passed. The sprayers 36 flood portion 38 to enable intimate and direct contact between the flue gas and the liquid. The liquid is applied in such volume as to collect particulates in the flue gas while also acting as a protective sheath for the heat exchanger to prevent its damage from corrosive constituents in the flue gas.

Although the liquid could be water, the liquid is preferably formed with ingredients suitable for absorbing and neutralizing various pollutants in the flue gas. These pollutants may be $SO_2$, $SO_3$ (in the form of $H_2SO_4$) and others, for which absorption and neutralizing techniques are well known, see for example, some of the aforementioned prior art publications. An alkaline wash liquid may be used to, for example, neutralize condensed $SO_3$ ($H_2SO_4$) and absorb $SO_2$.

In some cases the heat exchanger 32 may be sprayed with a powder at the same time that the liquid is applied. The powder may be of a type which neutralizes corrosive components. Use of such powders to protect heat exchangers against corrosion is known in the art.

While recuperative, regenerative, and heat pump types of heat exchangers 32 can be used, the heat exchanger 32 preferably is of the rotary regenerative type. The large surface area in such that exchangers enhances mixing and contact of flue gas pollutants with the absorbent alkaline wash liquid. The flue gas 18 in such case is passed through a hot zone portion of a rotor used in heat exchanger 32 and the liquid spray is directed at that hot zone with a flow rate selected to prevent a build-up of particulates and corrosive effects from condensed and absorbed pollutants. The spent liquid is collected at a drain 40 for processing in a suitable conventional scrubbing cycle.

Preferably the liquid is applied to the rotary heat exchanger in a manner sufficient to timely remove condensed corrosive constituents, i.e. before corrosive damage to the heat exchanger occurs, while reducing the cooling effect of the liquid on the heat exchanger process. One preferred technique for applying the liquid involves the intermittent application of a flooding amount of liquid to discreet portions of the rotary heat exchanger at sufficiently short intervals to prevent corrosive damage. The intervals may be related to the rotation of the rotary heat exchanger such as by effectively flooding the entire rotor once every several or more rotations of the rotary heat exchanger 32. The liquid is preferably applied to that part of the rotor where it is about to leave the "cold" region where combustion air passes through to move into the "hot" region where flue gas passes through.

Another technique for applying the liquid involves the application of a high pressure spray, through a nozzle that reciprocates at a desired speed, along a generally radial part of the rotor between its inner and outer diameters. In this manner the entire rotor is cleansed of condensed pollutants along a spiral path as the rotor rotates below the reciprocating nozzle.

The application of liquid in accordance with the invention to a preheater type heat exchanger such as 22 advantageously removes materials from the flue gas that clog the preheater to thus reduce the load on combustion air fan 26. As a result, the intervals between heat generator down times for the cleaning of preheater 22 can be considerably lengthened. Furthermore, in certain heat generators an additional combustion air preheater that is located ahead or upstream of the preheater 22 is used. Such additional preheater serves to assure a minimum temperature for the combustion air and thus avoid condensation of corrosive constituents, such as $H_2SO_4$, in the flue gas in preheater 22 during cold ambient air temperatures. The application of liquid to preheater 22 may thus allow a deletion of such additional air preheater for an improvement in the heat generator thermal efficiency.

Sufficient heat is transferred from the flue gas by the rotor in the rotary heat exchanger 32 to the inflow of air 16 to increase the latter's temperature significantly while the flue gas 18 is considerably cooled when it emerges at the outlet 42 of heat exchanger 32.

The flue gas temperature may in fact be so low that if discharged to atmosphere, the water vapor in the flue gas would create a visible plume. Since this is undesirable, a visibility suppression technique is used whereby the flue gas 18 from heat exchanger 32 is reheated with a heat exchanger 44, which thus also promotes rise of the flue gas from the stack. Appropriate moisture separators 46, 48 are placed at the outlets 42, 42' of heat exchanger 32 to collect and enable removal of droplets entrained by the gas flow through heat exchanger 32.

A significant improvement in the overall efficiency of the thermal section 30 is obtained with a heat exchanger such as 32 with which a substantial portion of heat in the flue gas 18 is recovered while pollutants are removed and the heat exchanger 32 is protected against corrosive effects of the removed pollutants. The thermal efficiency of the heat generator may be increased by about three and a half percent (3.5%). The net thermal efficiency, i.e. after allowing for additional energy requirements to implement the improvement of the invention, being about two and sixteenth of a percent (2.6%). In addition, less costly high sulfur containing fossil fuels may be used so that the operating costs of the thermal section 30 can be significantly reduced.

As a result of the thermal efficiency improvement, the temperature of the inflow of air 16 to boiler 12 at 50 is increased. It is estimated that the air flow can be raised to within 90° F. or even less from the temperature of the flue gas 18 at the outlet 52 of boiler 12.

The efficiency advantage of the invention can be illustrated with the following table of normal temperatures encountered in the prior art system of FIG. 1 in comparison with temperatures estimated to be generated in a system of FIG. 2.

TABLE 1

| Places | Temperatures FIG. 1 | FIG. 2 |
|---|---|---|
| At air inlet 54 | 70° F. | 70° F. |
| At outlet 42' | -na- | 266° F. |
| At boiler inlet 50 | 450° F. | 630° F. |
| At boiler outlet 52 | 650° F. | 650° F. |
| At reheater inlet 56 | -na- | 320° F. |
| At reheater outlet 58 | -na- | 300° F. |
| At outlet 42 | -na- | 120° F. |
| At stack 24 | 300° F. | 140° F. |

The efficiency advantage of the invention can further be illustrated with the following tables 2 and 3 normalized for a heat generator using one pound of combustion air and assuming a mass of flue gas of 1.06 pounds for a number 6 type fuel oil.

TABLE 2

| Places | FIG. 1 Temperature | FIG. 2 Temperature |
|---|---|---|
| At air inlet 54 | 70° F. | 70° F. |
| At outlet 42' | -na- | 253° F. |
| At boiler inlet 50 | 450° F. | 611° F. |
| At boiler outlet 52 | 650° F. | 650° F. |
| At reheater inlet 56 | -na- | 320° F. |
| At reheater outlet 58 | -na- | 300° F. |
| At outlet 42 | -na- | 120° F. |

TABLE 2-continued

| Places | FIG. 1 Temperature | FIG. 2 Temperature |
|---|---|---|
| At stack 24 | 300° F. | 139° F. |

TABLE 3

| | Heat Transfer Efficiency | | BTU Recovered From Flue Gas | | BTU Transferred to Combustion Air Or Reheated Flue Gas | |
|---|---|---|---|---|---|---|
| | FIG. 1 | FIG. 2 | FIG. 1 | FIG. 2 | FIG. 1 | FIG. 2 |
| Air Preheater 22 | 95% | 95% | 95.8 | 90.3 | 91.2 | 85.8 |
| Reheater 44 | na | 95% | na | 5.5 | na | 5.2 |
| Condenser - Heat Exchanger 32 | na | 89% | na | 49.3 | na | 43.9 |

The incremental efficiency improvement achieved with the invention using the data from Tables 2 and 3 is obtained using the relationship of:

$$\text{Efficiency increment \%} = \frac{.24(611 - 450)}{1130} \times 100 = 3.4\%$$

where 0.24 is the specific heat of air, 611-450 reflects the higher temperature of the flue gas into the boiler with the invention over the embodiment of FIG. 1, and 1130 is the amount of BTU released by the complete combustion of 0.06 pounds of #6 fuel oil with one pound of air to produce flue gas with 15% excess air in the resulting flue gas.

Having thus described an illustrative embodiment in accordance with the invention for improving the efficiency of the thermal section for a power plant, the advantages of the invention can be appreciated. The invention can be advantageously used without a preheater 22 and reheater 44 and for different heat generators such as those used in blast furnaces, municipal waste burning plants, chemical processes and the like. Variations from the described embodiment can be made, such as in the selection of the washing liquid and the heat exchangers without departing from the scope of the invention.

What is claimed is:

1. In a method for operating a heat generator wherein a fuel, containing pollutants, is burned with an inflow of air to generate a hot combustion gas which, after transfer of heat therefrom, exhausts as a flue gas at an elevated temperature and contains particulates and gaseous pollutants, the improvement comprising the steps of:

passing the flue gas and the inflow of air through a heat exchanger for the transfer of heat from the flue gas to said inflow of air for a preheating thereof, wherein the heat exchange relationship with the inflow of air is sufficient to reduce the temperature of the flue gas from a transfer of heat therefrom to the inflow of air for an enhanced thermal efficiency of the heat generator, with the temperature of the flue gas being reduced by said transfer of heat by said heat exchanger to a level where at least one of said pollutants condenses out from the flue gas within the heat exchanger; and simultaneously applying pollutant removing liquid onto the heat exchanger at a location enabling said liquid to remove, from the flue gas, pollutants and particulates while protecting said heat exchanger from removed and condensed corrosive pollutants and particulates.

2. The improved method for operating the heat generator as set forth in claim 1 wherein the liquid is applied in a manner sufficient to remove the condensed pollutant without a significant cooling effect on the heat exchange process.

3. The improved method for operating the heat generator as set forth in claim 1 wherein said liquid applying step includes:
applying a liquid which neutralizes and absorbs pollutants from said flue gas in said heat exchanger.

4. The improved method for operating the heat generator as set forth in claim 1 wherein said removed pollutant includes $SO_3$.

5. The improved method for operating the heat generator as set forth in claim 4 wherein said removed pollutant is $H_2SO_4$.

6. The improved method for operating the heat generator as set forth in claim 1 wherein the flue gas temperature is reduced to the order of about 120° F.

7. The improved method for operating the heat generator as set forth in claim 1, 2, 3, 4 or 5 and further including the step of:
passing said flue gas from which said pollutant and particulates have been removed in heat exchange relationship with the flue gas available prior to said removal step to reheat said pollutant and particulate depleted flue gas to a temperature sufficiently high for the suppression of a plume upon discharge of flue gas to atmosphere.

8. The improved method for operating the heat generator as set forth in claim 1, 2, 3, 4 or 5 wherein said flue gas is passed in heat exchange relationship with the inflow of air in a rotary regenerative heat exchanger.

9. The improved method for operating the heat generator is set forth in claim 1, 3, 4 or 5 wherein said liquid applying step consists of flood spraying the heat exchanger with said liquid to establish a running liquid condition in a zone of the heat exchanger in a manner sufficient to timely remove condensed corrosive pollutants while reducing the cooling effect of the liquid on the heat exchange process.

10. The improved method for operating the heat generator as set forth in claim 9 and further including the steps of:
separating moisture entrained by the inflow of air emerging from the heat exchanger; and
separating moisture entrained by flue gas emerging from the heat exchanger.

11. The improved method for operating the heat generator as set forth in claim 3 wherein said liquid is formed of an alkaline neutralizing solution.

12. The improved method for operating the heat generator as claimed in claim 1, 2, 3, 4 or 5 wherein said step for applying said pollutant removing liquid further comprises:
applying the liquid to the heat exchanger at intervals selected to prevent corrosive damage and to reduce the cooling effect of the liquid on the heat exchange process.

13. The improved method for operating the heat generator as claimed in claim 1, 2, 3, 4 or 5 wherein said step of applying said pollutant removing liquid further comprises:
applying the liquid intermittently at discrete portions of the heat exchanger.

14. The improved method for operating the heat generator as claimed in claim 8 wherein said step of applying said pollutant removing liquid further comprises:
applying the liquid to the rotary heat exchanger at intervals selected to prevent corrosive damage and to reduce the cooling effect of the liquid on the heat exchange process in the rotary heat exchanger.

15. The improved method for operating the heat generator as claimed in claim 8 wherein said step of applying said pollutant removing liquid further comprises:
applying the liquid along a portion of the rotary heat exchanger as it rotates to transfer heat from the flue gas to the combustion air.

16. The improved method for operating the heat generator as claimed in claim 15 wherein said step of applying said pollutant removing liquid further comprises:
applying the liquid along a portion of the rotary heat exchanger located where the rotor in said heat exchanger leaves the heat exchanger part through which combustion air passes.

17. The improved method for operating the heat generator as claimed in claim 16 wherein said step of applying said pollutant removing liquid further comprises:
reciprocating a liquid spray between the inner and outer diameter of the rotor of the heat exchanger while the heat exchanger is operating to transfer heat from the flue gas to the in-flow of air.

18. In a heat generator wherein a fuel, containing pollutants, is burned with an inflow of air to generate a hot combustion gas which exhausts as a flue gas at an elevated temperature and contains particulates and gaseous pollutants, the improvement comprising:
heat exchange means for transferring heat from the flue gas to the inflow of air wherein the heat exchange relationship is selected so as to reduce the temperature of the flue gas from a transfer of heat therefrom to the inflow of air for enhanced thermal efficiency of the heat generator, with the temperature of the flue gas being reduced by said transfer of heat by the heat exchanger means to a level where at least one of said pollutants condenses out from the flue gas within the heat exchange means; and
means for applying during said heat exchange a pollutant removing liquid onto said heat exchange means at a location selected to enable direct contact by the flue gas with said liquid for removal of pollutants and particulates from the flue gas and protection of said heat exchange means against corrosive effects of removed and condensed pollutants.

19. The improved heat generator as set forth in claim 18 wherein said heat transferring means is a rotary heat exchanger having a hot zone through which said flue gas is passed, and wherein said liquid is applied to said hot zone.

20. The improved heat generator as set forth in claim 19 and further including:
moisture separators respectively located in the path of the air inflow and the flue gas as they emerge from said rotary heat exchanger.

21. In a method for operating a heat generator in a large electrical power plant in which a fuel, containing pollutants, is burned with an inflow of air to generate a hot combustion gas in a boiler for heat exchange with a working fluid, and wherein the combustion gas is exhausted as a flue gas at an elevated temperature with particulates and gaseous pollutants and wherein the heat from the flue gas is passed to combustion gas in a preheater, the improvement comprising:

passing the flue gas, after its passage through said preheater, and the inflow of air through a heat exchanger for the transfer of heat from the flue gas to said inflow of air for preheating thereof to a temperature selected to enhance the thermal efficiency of the heat generator;

simultaneously applying pollutant removing liquid to the heat exchanger at a location enabling said liquid to remove from the flue gas, pollutants and particulate while protecting said heat exchanger from corrosive removed pollutants and particulates for an enhanced thermal efficiency of the heat generator in said large electrical power plant.

22. The improved method for operating the heat generator for a power plant as set forth in claim 21 wherein said step of transferring heat to the inflow of air includes the raising of the temperature of the inflow of air to a level generally within about ninety degrees fahrenheit of the temperature of said flue gas where it exhausts from said boiler.

23. The improved method for operating the heat generator for a power plant as set forth in claim 22 wherein said step of passing the flue gas through said heat exchanger further includes transferring sufficient heat from the flue gas to the inflow of air to lower the temperature of said flue gas to a level where a corrosive pollutant including $SO_3$ in the form of sulfuric acid condenses out from said flue gas and is flushed off the heat exchanger by said pollutant removing liquid.

24. In a method for operating a heat generator wherein a fuel, containing pollutants, is burned with an inflow of air to generate a hot combustion gas which, after transfer of heat therefrom exhausts as a flue gas at an elevated temperature and contains particulates and gaseous pollutants, the improvement comprising the steps of:

passing the flue gas and the inflow of air through a heat exchanger for the transfer of heat from the flue gas to said inflow of air for a preheating thereof; and simultaneously applying pollutant removing liquid onto the heat exchanger at a location enabling said liquid to remove, from the flue gas, pollutants and particulates while protecting said heat exchanger from removed corrosive pollutants and particulates without a significantly affecting the heat exchange process in the heat exchanger.

25. The method for operating the heat generator as claimed in claim 24 wherein said liquid applying step comprises:

applying the liquid intermittently at discrete portions of the heat exchanger.

26. The method for operating the heat generator as claimed in claim 24 wherein said liquid is applied at intervals selected to prevent corrosive damage.

27. The method for operating the heat generator as claimed in claim 24 wherein the heat exchanger is a rotary heat exchanger in which a rotor transfers heat from the flue gas to the inflow of air and wherein the liquid is applied along a portion of the rotary heat exchanger where the rotor enters the hot zone of the heat exchanger.

* * * * *